Jan. 6, 1959  D. T. AYERS, JR  2,867,193
POWER MECHANISM

Filed Feb. 15, 1955  2 Sheets-Sheet 2

INVENTOR
DAVID T. AYERS JR.

BY *John F. Phillips*
ATTORNEY

# United States Patent Office 2,867,193
Patented Jan. 6, 1959

2,867,193

POWER MECHANISM

David T. Ayers, Jr., Birmingham, Mich., assignor to Kelsey-Hayes Company, a corporation of Delaware Application February 15, 1955, Serial No. 488,217

17 Claims. (Cl. 121—41)

This invention relates to a booster power mechanism particularly adapted for use as a booster in conjunction with a vehicle.

The increasing practice of operating vehicle master cylinders by depending brake pedals has led to the development of booster mechanisms particularly adapted for use with such depending brake pedals. These mechanisms have been of a type wherein a booster motor is arranged in the driver's compartment between the fire wall and the pedal mechanism. In place of the usual unitary depending brake pedal, booster mechanisms of this type have employed two levers, one of which is foot operated and the other of which is power operated, and the hook-up has been such that each lever delivered a predetermined proportion of the power to the master cylinder plunger to displace fluid into the brake lines. In such prior constructions, the booster motors and master cylinders have been wholly separate units, vertically offset from and parallel to each other. Such mechanisms are highly advantageous in operation in several respects, but some objection has been voiced to the placing of the booster motor in the driving compartment of a vehicle.

An important object of the present invention is to provide a novel booster mechanism wherein the booster motor and master cylinder are combined as a single coaxial unit, arranged forwardly of the fire wall, and particularly intended to be operated by a depending brake pedal of the type now in generally common use.

A further object is to provide a novel unit of the character referred to wherein the booster motor is of such type as to eliminate concentricity manufacturing problems, a single relatively long plunger bearing maintaining the alinement of the parts and taking up any tendency toward minor misalinements.

A further object is to provide such an apparatus wherein the motor is of the bellows type provided with a stationary head fixed with respect to the master cylinder and a pressure movable head spaced therefrom and carrying therewithin the valve mechanism for the motor and the means for transmitting forces from the brake pedal to the master cylinder plunger, the flexibility of the bellows making it possible to support the plunger in a single bearing carried by the master cylinder, and to provide for the accommodation of any axial misalinement of the parts.

A further object is to provide such an apparatus wherein the motor is provided with a novel type of valve mechanism employing in conjunction therewith radial levers for transmitting to the brake pedal hydraulic reactions to provide the pedal with accurate "feel," any slight misalinement at the planes of contact of the reaction levers readily being compensated for through the flexibility of the bellows of the motor.

A further object is to provide a booster motor of the type referred to having a novel simplified means for supporting the reaction levers in position in the motor.

A further object is to provide flexible fluid sealing means between the plunger and the pressure movable head of the motor to permit the latter to shift to accommodate itself for any slight misalinement of the parts at the planes of contact of the reaction levers with their associated parts.

A further object is to provide such a mechanism wherein a follow-up valve mechanism controls energization of the motor and comprises a pair of valve elements in slidable engagement with each other, one valve element being carried by the master cylinder plunger rod and the other being carried by a head which is flexibly connected in sealed relation to the movable motor head, thus permitting the valve elements to maintain accurate sliding engagement at all times regardless of any slight movement of the movable head, which movement is allowed to take place in the manner discussed above.

A further object is to provide such an apparatus which, because of the use of a single supporting bearing for the plunger and the elimination of other points of friction occurrence, permits the use of a substantially lighter return spring for the motor, thus permitting the operator, in the event of a failure of power for the motor, to utilize a greater proportion of the foot-applied pressure on the brake pedal for applying the brakes.

Other objects and advantages of the invention will become apparent during the course of the following description.

In the drawings I have shown one embodiment of the invention. In this showing:

Figure 1:
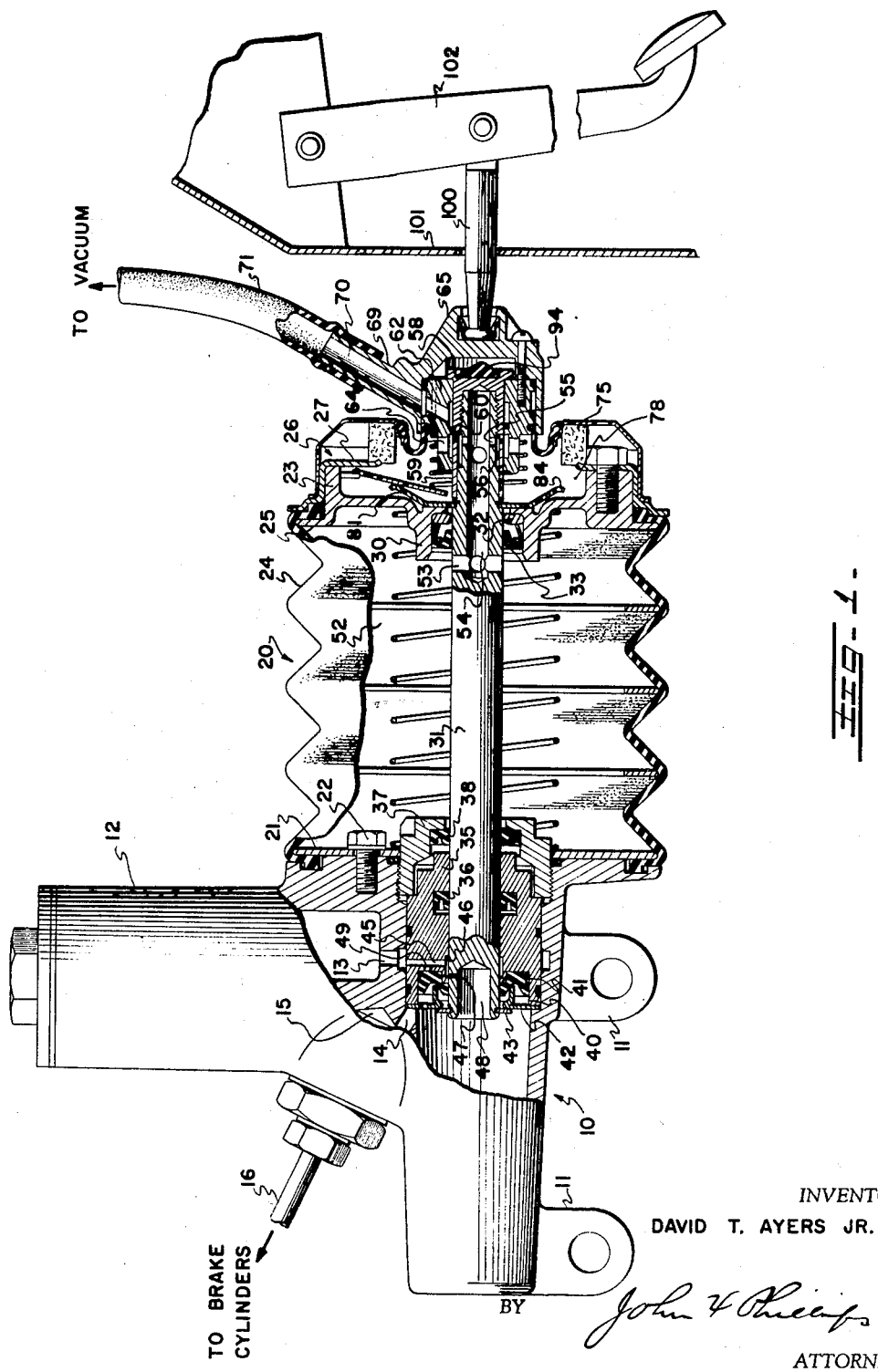
Figure 1 is a sectional view through the apparatus, the parts being shown in off positions and parts being shown in elevation.

Referring to Figure 1, the numeral 10 designates a conventional master cylinder provided with lugs 11 for the bolting of the unit to a suitable support on the motor vehicle. The master cylinder is provided with a reservoir 12 having a fluid opening 13 in the bottom thereof for replenishing fluid in the master cylinder in a manner to be described. The master cylinder is provided with an outlet opening 14 communicating with a chamber 15 in which is arranged a residual pressure valve of conventional type, not shown. The chamber 15 is provided with an outlet line 16 leading to the brake cylinders.

A booster motor indicated as a whole by the numeral 20 is arranged rearwardly of the master cylinder. This motor comprises a forward stationary head 21 secured to the body of the master cylinder as at 22. The motor further comprises a pressure movable head 23 and a bellows 24 is connected between the heads 21 and 23, the forward end of the bellows being fixed in position by the head 21 as shown in Figure 1. The rear end of the bellows 24 extends over a radially outer flange 25 formed integral with the head 23 and the bellows is fixed with respect to such flange by a cap member 26 having a radially inwardly extending wall 27 having a purpose to be described.

Axially thereof, the head 23 carries an integral sleeve portion 30 through which is slidable the rear end of a plunger 31. The sleeve portion 30 is provided with a resilient seal 32 forwardly of which is arranged a deformable packing member 33, the members 32 and 33 permitting a slight altering of the axial position of the sleeve 30 relative to the plunger 31 for a purpose to be referred to.

The forward end of the plunger 31 extends through an elongated bearing 35 mounted in the master cylinder and provided interiorly thereof with a double-lipped seal 36 surrounding the plunger 31. The bearing 35 is retained in position by a nut 37, also provided with a double-lipped seal 38, the seals 36 and 38 serving to prevent any leakage of hydraulic fluid from the master cylinder into the motor.

The bearing 35 has its forward end annularly recessed as at 40 to receive a seal 41 retained in position by a keeper 42 engaged in the off positions of the parts by a snap ring 43 carried by the adjacent end of the plunger 31.

Rearwardly of the seal 41, the bearing 35 is provided with a radial port 45 communicating with an annular groove 46 within the bearing 35, and this groove, in the off position of the plunger 31, communicates through a radial port 47 in the plunger with an axial recess 48 formed in the master cylinder end of the plunger. The elements just referred to act to provide for replenishing any fluid lost from the master cylinder, as will be apparent. A small port 49 connects the port 45 to the inner end of the bearing recess 40 for the seepage of hydraulic fluid around the seal 41 to tend to prevent undue drop in pressure in the hydraulic fluid in the master cylinder upon the sudden retraction of the plunger 31. It will be apparent that this plunger, in moving forwardly, disconnects the port 47 from the port 45, whereupon the plunger displaces fluid from the master cylinder into the brake line 16.

The heads 21 and 23 and bellows 24 define a variable pressure motor chamber 52 which communicates through radial ports 53 with an axial bore 54 in the plunger 31. This bore communicates through radial ports 55 with an annular groove 56 formed in the outer surface of the plunger 31. The rear end of the bore 54 is closed by a cap 58 threaded on the plunger and having a rearwardly extending sleeve portion 59 provided with radial ports 60. These ports are in constant communication with the groove 56. The sleeve portion 59 is surrounded by a sleeve 62 having an internal annular groove 63 communicating, when the parts are in the off positions shown in Figure 1, with the ports 60. The groove 63 communicates with the radial ports 64 in the sleeve 62.

Figure 2:
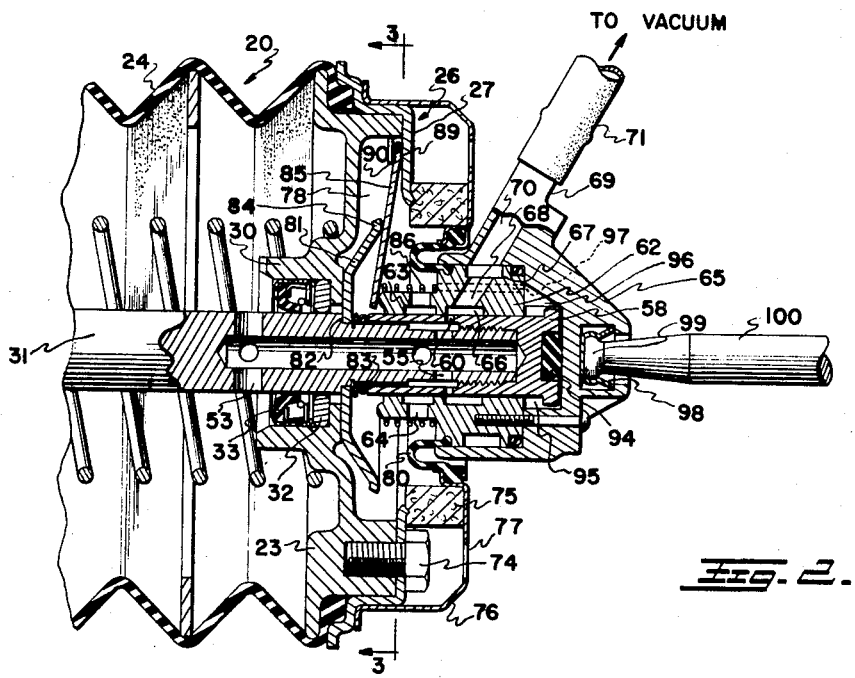
Figure 2 is an enlarged fragmentary axial sectional view through the movable motor head and valve mechanism and associated elements, the valve parts being shown in motor energizing positions.

A preferably die-cast cap member 65 is arranged over the cap 58 and is axially recessed to receive the sleeve 62. This sleeve is internally annularly grooved as at 66, and this groove communicates with the port 60 in the motor energized positions of the parts as shown in Figure 2. The sleeve 62 is also provided with an external annular groove 67 communicating with the groove 66 through a port 68. The cap member 65 is provided with a nipple extension 69 provided with a passage 70 therethrough communicating with the groove 67, and the extension 69 is adapted for connection with a flexible hose 71 leading to the intake manifold of the motor vehicle engine. Accordingly, vacuum is always present in the groove 66 to effect energization of the motor 20, as further described below, whenever the valve parts occupy the positions shown in Figure 2.

The wall 27 of the cap member 26 is secured to the head 23 by screws 74, and the radially inner extremity of the cap wall 27 engages the adjacent face of an air cleaner 75. This cleaner is retained in position by a shell 76 apertured as at 77 for the flow of air into the shell. The head 23, wall 27, air cleaner 75 and associated elements define an air chamber 78 which obviously always is in communication with the groove 63 to supply air to the motor 20 when the valve parts are in the off positions shown in Figure 1.

A diaphragm 80 has its radially inner extremity fixed between the sleeve 62 and cap 65. The outer periphery of the diaphragm 80 is sealed with respect to the shell 76. Accordingly, the diaphragm 80 seals the chamber 78 from direct communication with the atmosphere so that air passing into the chamber 78 must flow through the air cleaner 75.

Figure 3:
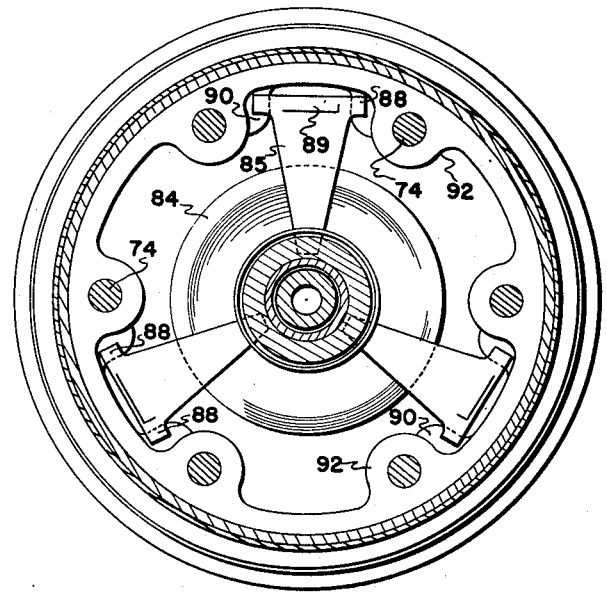
Figure 3 is a section on line 3—3 of Figure 2.

An annular plate 81 is arranged in the chamber 78 and is seated against the sleeve portion 30 of the head 23 when the parts are in their off positions. The plate 81 seats against a shoulder 82 on the plunger 31 and a cushion in the nature of an O-ring 83 is interposed between the plate 81 and the adjacent end of the sleeve portion 59. The outer periphery of the plate 81 is curved to provide an annular edge 84 serving as a rocker fulcrum for a plurality of radial levers 85. These levers preferably are three in number and arranged as shown in Figure 3. Each lever 85 has its radially inner end engaging against the adjacent end of the sleeve 62, and such sleeve has its inner end surrounded by a spring 86 to urge the inner ends of the levers 85 toward the left as viewed in Figure 2.

Each lever 85 preferably is of tapered construction as shown in Figure 3, having its wider end at the radially outer extremity thereof, and such portion of each lever is provided with lateral extensions 88 between which the associated lever is bowed as at 89 to provide a rocker fulcrum edge engageable against the cap wall 27.

The attaching screws 74 pass through bosses 92 (Figure 3) and between adjacent pairs of these bosses are arranged inwardly extending lugs or webs 90 overlying the projections 88, thus confining the radially outer ends of the levers between the lugs 90 and the cap wall 27, the bosses 92 preventing substantial shifting of the outer ends of the levers 85 laterally thereof.

The cap member 58 is recessed in its rear end to receive a cushion member 94 normally disengaged from the adjacent end of the cap 65 (Figure 1) and engageable therewith during motor energization as shown in Figure 2. The cap 65 is provided with a recess 95 in which the rear end of the cap member 58 is movable, and the maintenance of atmospheric pressure in the recess 95 is assured by connecting such recess with the chamber 78 through a grove 96 in the cap 65 and a passage 97 in the sleeve 62.

The rear end of the cap 65 is recessed to receive a socket member 98 receiving the head 99 of a push rod 100. This push rod extends through the fire wall 101 of the motor vehicle for connection at its rear end with any suitable type of pedal, very generally represented in Figure 1 and indicated by the numeral 102.

*Operation*

All of the parts have been shown in Figure 1 in their normal off positions, while the valve parts in Figure 2 occupy motor energizing position. With the parts in off positions, air is supplied through the air cleaner 75 into chamber 78, thence through ports 64 and 55 into the bore 54 and ports 53 to the motor chamber 52. The ports 55, being out of registration with the groove 66, the source of vacuum will be cut off from the motor.

The brakes are applied by operating the pedal 102 to move the rod 100 to the left in Figure 1, thus bodily shifting the cap 65 and the sleeve 62 mounted therein, the flexible diaphragm 80 permitting such movement. The ports 60 will be closed upon movement of the cap 65 toward the left, and these ports will be opened to the vacuum groove 66, thus exhausting air from the motor through ports 53, bore 54 and ports 55 and 60 (see Figure 2).

As soon as the ports 60 are cracked to the groove 66 a drop in pressure will occur in the motor chamber 52 and movable head 23 will start to move to the left. Such movement of the head 23 applies a force from the wall 27 to the radially outer ends of the levers 85, while manual movement of the sleeve 62 applies force to the inner ends of the levers. These combined forces apply pressure to the fulcrum edge 84 of the plate 81, thus imparting movement to the plunger 31 to displace fluid from the master cylinder 10.

Attention is invited to the fact that the left-hand end of the sleeve 62 is spaced from the radially inner ends of the levers 85 in the off positions of the parts, as shown in Figure 1. Therefore, initial movement of the brake pedal takes place solely against the tension of the relatively light spring 86. As soon as initial energization of the motor occurs, however, the levers will have their radially outer ends moved to the left by the cap 26 and, accordingly, the levers will swing to move their radially inner ends into engagement with the adjacent end of the sleeve 62. From this point on, hydraulic reaction forces will be applied from the levers 85 to the sleeve 62 and thence through the cap 65 and rod 100 to the pedal 102. Thus this pedal will be provided with "feel" represented by reaction forces which will be proportional to pressures in the master cylinders 10.

The sealing means comprising elements 32 and 33 provide for sliding engagement between the movable head 23 and plunger 31. In the initial operation of the motor, therefore, the head 23 moves out of contact with the reaction plate 81 and remains out of contact therewith until the motor has been energized to the maximum extent. This point occurs prior to a maximum application of the brakes. Thereafter, differential pressures affecting the head 23 will be insufficient to advance this head, and further force applied to the pedal 102 will cause the sleeve 59 to apply direct force through the ring 83 to the plunger 31, and accordingly pedal applied forces will assist the motor in effecting maximum brake application, if this is necessary.

The valve mechanism, of course, provides the usual follow-up action of the plunger 31 relative to the brake pedal. The brakes are released by releasing the pedal 102. The spring 86 moves the sleeve 62 relative to the valve sleeve 59 to return the valve parts to normal positions, the source of vacuum again being cut off from the motor and air being supplied thereto. The usual motor return spring returns the head 23 to its normal off position and movement of the parts to such position is limited by engagement of the snap ring 43 with the stop member 42.

The present construction provides a novel and efficient arrangement of parts whereby a booster motor and master cylinder unit may be combined without the usual concentricity manufacturing problems which frequently cause trouble where it is necessary to perfectly aline spaced bearings. With the present construction, the bearing 35 is made relatively long and affords adequate bearing support for the plunger 31. The rear end of the plunger 31 supports the movable motor head 23 and all of the parts carried thereby. Such parts, however, where necessary can alter their positions quite easily to compensate for manufacturing inequalities. The inequalities are slight but are sufficiently serious to cause trouble where spaced bearings must be maintained in perfect alinement.

Referring to Figure 1, it will be apparent that the seals 32 and 33 permit a reasonable degree of rocking movement between the head 23 and the plunger 31 in the event there is any inequality between the planes of contact of the levers 85 with the wall 27, plate 81 and sleeve 62. The sleeve 59 supports the sleeve 62 for accurate sliding movement thereon, and any slight rocking which takes place between the head 23 and the plunger 31 and any parts maintained in position thereby will be permitted by virtue of the use of the flexible sealing diaphragm 80. Accordingly, the present construction simplifies manufacture and eliminates troubles arising through misalinement of parts due to faulty concentricity. Thus the present construction renders it highly practicable to combine as one unit a master cylinder and booster unit.

Preferably, the left-hand end of the sleeve 59 is of very slightly greater diameter than the plunger 31, thus facilitating the threading of the sleeve 59 on the plunger 31. However, such end of the sleeve 59 engages the highly resilient ring 83 to prevent leakage of air from the chamber 78 into the groove 56 and thence into the motor. The cushion 83, however, takes the thrust after maximum motor energization takes place, to transmit pedal applied forces to the plunger 31. This eliminates the necessity for applying such forces at the inner ends of the levers 85, and thus avoids undue flexing of the levers under the conditions stated.

The use of the lugs or webs 90 is highly advantageous in the assembling of the device, the levers 85 being placed in position against the lugs 90, whereupon the cap 26 is placed in position and secured to the head 23. The cap 26 serves the dual function of maintaining the levers 85 in position without employing separate pivot pins therefor and of securing the adjacent end of the bellows 24 to the head 23.

It is to be understood that the form of the invention shown and described is to be taken as a preferred example of the same and that such changes in the shape, size and arrangements of the parts may be made as do not depart from the spirit of the invention and the scope of the appended claim.

I claim:

1. A power mechanism comprising an axially elongated bearing, a plunger slidable in said bearing, a motor comprising a stationary head fixed with respect to said bearing, a movable head supported solely by said plunger and spaced from said stationary head, and a bellows connected between said heads and forming therewith a motor chamber, a follow-up control valve mechanism having fluid connection with said motor chamber and with the atmosphere and a source of vacuum, said follow-up control valve mechanism comprising a pair of valve elements relatively movable axially of said plunger, one valve element being carried by said plunger, means having mechanical engagement with said plunger and with said movable head and with the other of said valve elements for delivering power from said other valve element and said movable head to said plunger, and a pedal connected to the other valve element to move it with respect to said one valve element to disconnect said motor from the atmosphere and connect it to said source.

2. A power mechanism comprising an axially elongated bearing, a plunger slidable in said bearing, a motor comprising a stationary head fixed with respect to said bearing, a movable head supported solely by said plunger and spaced from said stationary head, and a bellows connected between said heads and forming therewith a motor chamber, a follow-up control valve mechanism having fluid connection with said motor chamber and with the atmosphere and a source of vacuum, said follow-up control valve mechanism comprising a pair of valve elements relatively movable axially of said plunger, one valve element being carried by said plunger, said movable head being movable in one direction relative to said plunger, a plate fixed to said plunger against movement relative thereto in said direction, means engaging said plate and connected to said movable head and to the other of said valve elements for delivering power from the latter to said plate, and a pedal connected to the other valve element to move it with respect to said one valve element to disconnect said motor from the atmosphere and connect it to said source.

3. Apparatus according to claim 2 wherein said means for delivering power to said plate comprises radial lever members engaging at their radially outer and inner ends respectively against said movable head and said other valve element and engageable intermediate their ends with said plate.

4. A power mechanism comprising an axially elongated bearing, a plunger rod slidable through said bearing, a motor comprising a stationary head fixed with respect to said bearing, a head structure spaced from said stationary head and supported solely by said plunger rod, and a bellows connected between said stationary head and said head structure and forming therewith a motor chamber, said head structure comprising a movable head, flexible sealing means within said movable head, said flexible sealing means slidably surrounding said plunger rod and accommodating limited movements of said movable head out of axial alinement with said plunger rod, power delivering means connected between said movable head and said plunger rod, a control valve mechanism for said motor carried thereby and having fluid connection with said motor chamber and with the atmosphere and a source of vacuum, and a pedal connected to said valve mechanism for operating it to disconnect said motor chamber from the atmosphere and connect it to said source.

5. Apparatus according to claim 4 wherein said valve mechanism comprises a pair of valve elements one carried by said plunger rod and the other connected to said pedal.

6. Apparatus according to claim 4 wherein said valve mechanism comprises a pair of valve elements one carried by said plunger rod and the other connected to said pedal, said power delivering means engaging said head structure, said other valve element and said plunger rod for delivering power to the latter from said head structure and said other valve element.

7. Apparatus according to claim 4 wherein said valve mechanism comprises a pair of valve elements one carried by said plunger rod and the other connected to said pedal, said movable head being movable in one direction relative to said plunger rod, said power delivering means comprising a plate fixed to said plunger rod, and mechanism engaging said head structure, said other valve element and said plate for delivering power from said head structure and said other valve to said plate.

8. Apparatus according to claim 4 wherein said valve mechanism comprises a pair of valve elements one carried by said plunger rod and the other connected to said pedal, said movable head being movable in one direction relative to said plunger rod, said power delivering means comprising a plate fixed to said plunger rod, and mechanism engaging said head structure, said other valve element and said plate for delivering power from said head structure and said other valve element to said plate, and a return spring extending between and engaging said heads and urging said movable head in the other direction to an off position, said plate serving as a stop engaging said movable head when the latter is in said off position.

9. A power mechanism comprising an axially elongated bearing, a plunger rod slidable through said bearing, a motor comprising a stationary head fixed with respect to said bearing, a head structure spaced from said stationary head and comprising a movable head surrounding said plunger rod, and a bellows connected between said heads and forming therewith a motor chamber, flexible sealing means carried by said movable head and surrounding said plunger rod in sealing relation therewith, said sealing means accommodating limited movements of said movable head out of axial alinement with said plunger rod, a valve mechanism comprising a pair of concentric valve elements one carried by said plunger rod, said valve mechanism having fluid connection with said motor chamber and with the atmosphere and a source of vacuum, a cap member carrying said other valve element, sealing means connected between said cap member and said head structure and forming therewith an atmospheric chamber, an air cleaner carried by said head structure and through which air flows into said atmospheric chamber, and a pedal connected to said cap member to move the latter together with said other valve element to operate said valve mechanism.

10. Apparatus according to claim 9 wherein said movable head is movable in one direction relative to said plunger member, and means connected between said other valve element, said head structure and said plunger for delivering to the latter forces from said head structure and said other valve element.

11. Apparatus according to claim 9 wherein said movable head is movable in one direction relative to said plunger member, a plate surrounding and fixed to said plunger rod in said atmospheric chamber and provided with an annular fulcrum edge, and radial lever elements engaging at their radial ends respectively against said movable head structure and said other valve element and engaging intermediate such ends against said fulcrum edge.

12. A motor structure comprising an elongated stationary bearing, a motor unit comprising a stationary head adjacent and fixed with respect to said bearing, a movable head spaced from said stationary head and a bellows connecting said heads and forming therewith a motor chamber, a plunger rod slidable in said bearing and projecting through said motor unit, flexible sealing means arranged between and engaging said movable head and said plunger rod and flexibly supporting said movable head for limited movement out of axial alinement with said plunger rod, said movable head being supported solely by said sealing means, and a valve mechanism carried by said motor unit and comprising axially movable valve elements one of which is carried by said plunger rod, said valve mechanism having fluid connection with said motor chamber and with the atmosphere and a source of vacuum.

13. A motor structure according to claim 12 provided with means having mechanical engagement with said movable head and with said other valve element and said plunger rod for delivering power to the latter from said movable head and said other valve element.

14. Apparatus according to claim 12 wherein said sealing means slidably supports said movable head for movement axially of said plunger rod, a plate fixed with respect to said plunger rod, and radial lever elements engageable intermediate their ends with said plate and adjacent their ends with said movable head and said other valve element.

15. Apparatus according to claim 12 provided with a cap member carrying the other valve element, said cap member extending across and having lost motion connection with respect to said one valve element, and a cushion interposed between said one valve element and said cap member.

16. A motor structure comprising an elongated stationary bearing, a motor unit comprising a stationary head adjacent and fixed with respect to said bearing, a head structure spaced from said stationary head and including a movable head, and a bellows connected between said stationary head and said movable head and forming therewith a variable pressure motor chamber, a plunger rod slidable in said bearing and projecting through said motor unit, flexible sealing means carried by said movable head and surrounding and slidably engaging said rod to seal against fluid leakage around the latter and to accommodate limited movements of said motor head out of axial alinement with said plunger rod, said head structure being provided with an atmospheric chamber, an air cleaner through which air flows into said atmospheric chamber, a follow-up valve mechanism comprising a pair of concentric valve elements one of which is fixed to said plunger rod and the other of which is slidably mounted on said one valve member, said valve mechanism having fluid connection with said motor chamber and with said atmospheric chamber and a source of vacuum, a flexible sealing diaphragm connected between said other valve element and said movable head structure, a plate in said atmospheric chamber fixed to said rod, and radial lever members engaging intermediate their ends against said plate and adjacent their radially outer and inner ends respectively against said movable head structure and said other valve element.

17. Apparatus according to claim 16 wherein each radial lever element at its outer end has laterally extending portions, said movable head having integral portions overlying said extending lever portions at one side thereof, said movable head structure comprising a shell overlying said extending lever portions at the opposite side thereof.

(References on following page)

References Cited in the file of this patent

UNITED STATES PATENTS

| | | |
|---|---|---|
| 1,620,513 | Bragg et al. | Mar. 8, 1927 |
| 1,781,868 | Bragg et al. | Nov. 18, 1930 |
| 1,878,786 | Lombard | Sept. 20, 1932 |
| 1,879,365 | Lombard | Sept. 27, 1932 |
| 1,902,356 | De Monge | Mar. 21, 1933 |
| 1,932,649 | Trachsel | Oct. 31, 1933 |
| 2,165,942 | Rossmann | July 11, 1939 |
| 2,207,700 | Porter | July 16, 1940 |
| 2,744,502 | Frantz | May 8, 1956 |